Sept. 27, 1932.  T. H. THOMAS  1,879,644
SIGNAL AND BRAKE SYSTEM
Filed Aug. 9, 1929
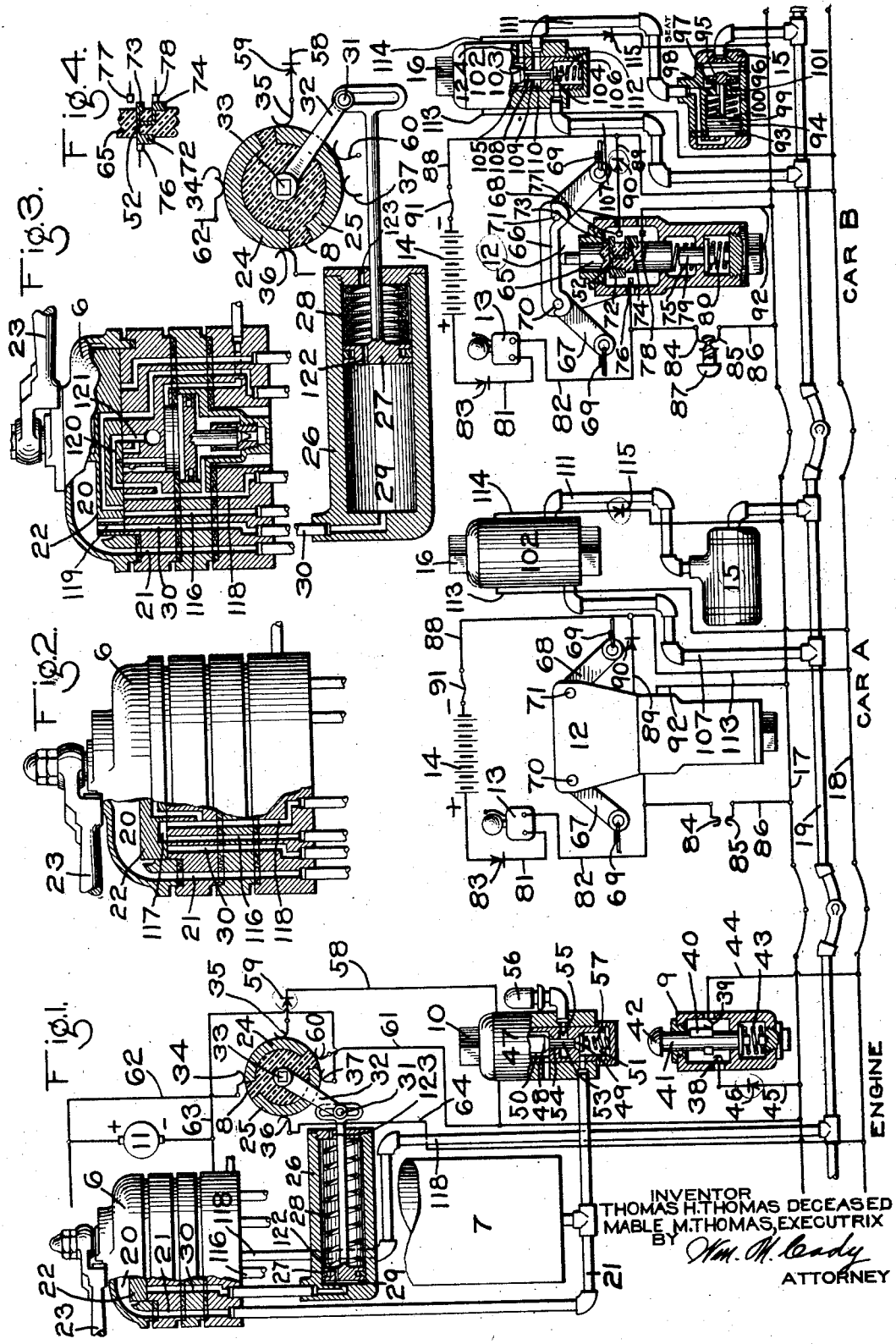
INVENTOR
THOMAS H. THOMAS DECEASED
MABLE M. THOMAS, EXECUTRIX
BY
Wm. M. Cady
ATTORNEY Patented Sept. 27, 1932

1,879,644

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SIGNAL AND BRAKE SYSTEM

Application filed August 9, 1929. Serial No. 384,658.

This invention relates to a combined fluid pressure brake and signal system which is controlled electrically and which is of the same general type as the two systems of Clyde C. Farmer, described and claimed in applications for United States Letters Patent for fluid pressure brake and signal system, filed May 27, 1929, Serial No. 366,121 and filed June 1, 1929, Serial No. 367,791.

In the first of the above referred to applications, direct electric current is employed for operating the signals on the train and direct current of higher potential is employed for operating a magnet valve device to control the local venting of the brake pipe in effecting an emergency application of the brakes. With this arrangement the resistance of the magnet of the magnet valve device must be great enough to prevent the energization of said magnet when current is supplied for operating the signal devices. When each car of a train is equipped with a magnet valve device, the combined resistance offered by the magnets of all of the magnet valve devices will be such that a very high voltage must be provided to energize said magnets to insure the proper operation of the brakes in effecting an emergency application.

In the second of the above referred to applications, direct current is employed for operating the signals on the train and alternating current is employed for operating the magnets of the emergency magnet valve devices. While with this arrangement the resistance of the emergency magnets may be such that the voltage required to energize said magnets is reduced to a minimum, it is necessary to employ two sources of current, one for supplying direct current for the purpose of operating the signal devices, and another for supplying alternating current for operating the emergency magnets.

An object of this invention is to provide a combined fluid pressure brake and signal system which is controlled electrically and in which the current is caused to flow in one direction for effecting the operation of the signal devices and in the opposite direction for the purpose of energizing the magnets of the emergency magnet valve devices.

Another object of the invention is to provide a combined fluid pressure brake and signal system in which electrically controlled signal devices and electrically controlled brake devices are adapted to be supplied with direct current through a common circuit, and in which means are provided for controlling the circuit so that the electric current is caused to flow in one direction through the circuit for operating said signal devices and in the opposite direction for effecting the operation of said brake devices.

Another object of the invention is to provide a combined fluid pressure brake and signal system in which electrically controlled signal devices and electrically controlled brake devices are adapted to be supplied with direct current through a common circuit, said brake devices being inoperative when the current flows through the circuit in the direction in which the signal devices are rendered operative, and the signal devices are inoperative when the direction in which the current flows through the circuit is reversed for the purpose of operating said brake devices.

Another object of the invention is to provide an improved combined brake and signal system of the character mentioned, which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, Figure 1 is a diagrammatic view partly in section of a combined fluid pressure brake and signal system constructed according to the invention, showing the same in release position; Fig. 2 is an enlarged view, partly in section, of the brake valve in release position; Fig. 3 is an enlarged section of the brake valve and the emergency switch device in emergency position, and Fig. 4 is a detail section of a portion of the trainman's switch device, showing the relative positions of the contacts when the plunger is in its lowermost position.

Referring to the drawing, the combined brake and signal system for the locomotive of a train may comprise a brake valve device 6, a main reservoir 7, a pneumatically operated emergency switch device 8, a signal switch device 9, an engineman's signal indicating device 10, and an electric current supply source in the form of a generator 11 for supplying direct current.

The equipment on each of the cars of the train may comprise a trainman's switch device 12, a signal indicating device 13, an electric current supply source in the form of a storage battery 14 for supplying direct current, a brake pipe vent valve device 15 and a magnet valve device 16.

Extending continuously throughout the length of the train are two train wires 17 and 18, and also the usual brake pipe 19, said train wires and brake pipe being connected, between the cars in the usual manner.

The brake valve device 6 may comprise a casing having a chamber 20 connected to the main reservoir 7 through a pipe and passage 21 and contains a rotary valve 22 which is adapted to be operated by a handle 23.

The emergency switch device 8 may comprise a rotatable member or drum formed from insulating material and provided with a pair of spaced contact segments 24 and 25, which may be embedded in the insulating material in the manner shown.

For the purpose of actuating the switch, any suitable means may be utilized. In the present instance, there is shown pneumatically operated means for this purpose which are controlled by the brake valve device 6, said means comprising a cylinder 26, containing a piston 27 subject on one side to the pressure of an expansible coil spring 28. The chamber 29 on the opposite side of said piston is connected to the brake valve device 6, through a pipe and passage 30 leading to the seat of the rotary valve 22. The stem of the piston 27 is connected by a pin 31 to an arm 32 projecting laterally from the shaft 33 of the switch drum.

The contact 24 is adapted in one position to electrically connect terminal contacts 34 and 35, while the contact 25 is adapted in this position to eletrically connect terminal contacts 36 and 37. As will be hereinafter described, the contact 24, in another position, is adapted to connect terminal contacts 34 and 36, and the contact 25 is adapted to connect terminal contacts 35, 37 and 60.

The engineman's switch device 9 may comprise a casing having contact terminals 38 and 39 mounted therein which are adapted to be engaged by a connector 40 carried by a plunger 41 which is adapted to be operated in one direction through the medium of a foot button 42 and in the opposite direction by the pressure of a spring 43 interposed between the plunger and the casing.

The contact terminal 39 is connected to the train wire 18 by a wire 44, and the contact terminal 38 is connected to the train wire 17 by a wire 45. Interposed in the wire 45 is a rectifier 46, which permits current to flow therethrough only in the direction indicated by the arrow.

The engine signal indicating device 10 may comprise an electro-magnet 47 and double beat valves 48 and 49 adapted to be operated by said magnet. The valve 48 is contained in a chamber 50, while the valve 49 is contained in a chamber 51 which is connected with the main reservoir 7 through pipe 21.

The valves 48 and 49 may be connected by a fluted stem 53 mounted in a bore 54 in the casing. Intermediate its length, the bore 54 is enlarged to provide a chamber 55, and a whistle 56 is connected to said chamber. A spring 57, contained in chamber 51, acts on the valve 49, tending to seat the same and unseat the valve 48.

One terminal of the magnet 47 is connected to the terminal contact 35 by a wire 58. Interposed in the wire 58 is a rectifier 59, which permits current to flow therethrough only in the direction indicated by the arrow. The other terminal of the magnet 47 is connected to terminal contact 60 of the emergency switch device 8, and also to the train wire 17, by a wire 61. With the piston 27 in its outer position, as shown in the drawing, the terminal contact 60 does not engage either of the contact segments 24 or 25.

The positive terminal of the generator 11 is connected to the terminal contact 34 by a wire 62, while the negative terminal of the generator is connected to the terminal contact 37 by a wire 63.

The terminal contact 36 is connected to the train wire 18 by a wire 64.

The trainman's switch device 12 on each car of the train may comprise a casing which contains a plunger 65 adapted to be operated by a lever 66 having operating arms 67 and 68, each having an operating cord 69 connected thereto.

Mounted on the casing are fulcrum pins 70 and 71, which are so disposed that when the arm 67 is operated, the lever 66 turns about the fulcrum pin 70 to operate the plunger 65 and when the arm 68 is operated, the lever turns about the fulcrum pin 71 to operate said plunger.

The plunger 65 is provided with a connector 52 provided with contacts 72, 73 and 74 which are normally maintained in the position shown in Fig. 1, by the pressure of a spring 75.

Arranged within the casing are contact terminals 76, 77 and 78. When the plunger 65 is moved downwardly from its normal position to the position in which the lower end of the plunger engages the upper end of a stop 79 which is slidably mounted in the casing and which is subject to the pressure of a spring 80, the contacts 72, 73 and 74 will respectively engage the contact terminals 76, 77 and 78. Further downward movement of the plunger 65 is now resisted by the pressure of the spring 80, and when the stop 79 comes to rest against the bottom of the casing, the contact 73 will be disengaged from the contact terminal 77, while the contact 72 will remain in engagement with the contact terminal 76 and the contact 74 will remain in engagement with the contact terminal 78, for the purpose to be hereinafter described.

The signal indicating device 13 may be a bell having one of its terminals connected to the positive terminal of the battery 14 by a wire 81 and its other terminal connected to the contact terminal 76 by a wire 82. Interposed in the wire 81 is a rectifier 83, which permits current to flow therethrough only in the direction indicated by the arrow.

On each car of the train a jack may be provided having spaced tines 84 and 85, the tine 84 being connected to the wire 82 and the tine 85 being connected to the train wire 17 by a wire 86. To electrically connect these tines, a plug 87 may be employed which, when inserted between them, forms a connection from the bell 13 to the train wire 17. The plug 87 is inserted between the tines of the jack on each car of the train at which it is desired to receive signals originated by the engineman.

The negative terminal of the battery 14 is connected to the train wire 18 by a wire 88. The contact terminal 77 is connected to the wire 88 by a wire 89. Interposed in the wire 89 is a rectifier 90, which permits current to flow therethrough only in the direction indicated by the arrow, and interposed in the wire 88 at a point between the negative terminal of the battery 14 and the wire 89, is a fuse 91.

The contact terminal 78 is connected to the train wire 17 by a wire 92.

The vent valve device 15 may comprise a casing having a chamber 93 containing a piston 94 having a stem which is provided with a valve 95 contained in a chamber 96 connected to the brake pipe 19, said valve being adapted to seal against a seat ring 97 formed on the wall 98 of the casing. On the side opposite to the chamber 93, piston 94 is subject to the pressure of a spring 99 contained in a chamber 100, open to the atmosphere. The stem of the piston 94 extends through an opening 101 formed in the wall 98.

The magnet valve device 16 may comprise a magnet 102 and double beat valves 103 and 104 adapted to be operated by said magnet. The valve 103 is contained in a chamber 105, while the valve 104 is contained in a chamber 106 which is connected with the brake pipe 19 through a pipe 107.

The valves 103 and 104 may be connected by a fluted stem 108 mounted in a bore 109 in the casing. Intermediate its length, the bore 109 is enlarged to provide a chamber 110 which is connected with the piston chamber 93 of the vent valve device 15, through a pipe 111. A spring 112, contained in chamber 106, acts on the valve 104, tending to seat the same and unseat the valve 103.

One terminal of the magnet 102 is connected with the train wire 18, by a wire 113, and the other terminal of said magnet is connected with the train wire 17 by a wire 114. Interposed in the wire 114, is a rectifier 115, which permits current to flow therethrough only in the direction indicated by the arrow.

With the brake valve device 6 in running position, as shown in Figs. 1 and 2, the brake pipe 19 is supplied with fluid under pressure from the usual feed valve device (not shown), through a pipe and passage 116; cavity 117 in the rotary valve 22 of the brake valve device and passage and pipe 118 (see Fig. 2). Fluid thus supplied to the brake pipe 19 flows to the valve chamber 96 in the vent valve device 15 and to the chamber 106 in the magnet valve device 16.

When the engineman desires to signal the trainman, and assuming that the plug 87 is inserted between the tines 84 and 85 on the car B, the engineman depresses the foot button 42 of the switch device 9 a sufficient distance that the connector 40 connects the contact terminals 38 and 39, thus closing the circuit from train wire 17 to train wire 18 so that current from the battery 14 will flow through the signal indicating device 13 and cause said device to operate to sound the signal initiated by the engineman.

With the emergency switch device 8 in release position, as shown in Fig. 1 of the drawing, when the signal switch device 9 is actuated in the above described manner, magnet 47 of the engineman's signal device 10 will be energized by current supplied from the generator 11. The current will flow from the positive terminal of the generator 11, through wire 62 and terminal contact 34 to contact 24 of the emergency switch device 8, and from thence through terminal contact 35 and wire 58 past the rectifier 59 to the magnet 47.

From the magnet 47, the current flows through wire 61 to train wire 17, and thence through wire 45, past the rectifier 46, to the signal switch device 9, returning to the negative terminal of the generator 11, through wire 44, train wire 18, wire 64, terminal contact 36, contact 25, terminal contact 37, and wire 63.

The magnet 47 being energized, valve 48 is seated and valve 49 is unseated, thereby opening the communication through which fluid under pressure is supplied from the main reservoir 7 to operate the whistle 56.

In this way the car signal device 13 and the locomotive whistle 56 will both be actuated to sound a signal initiated by the engineman.

When the engineman releases the push button 42, the switch device 9 will be opened thus opening the train wire circuit, and preventing further operation of the signal devices, as will be readily understood.

Should the trainman desire to signal the engineman, the trainman operates the lever 66 of the switch device 12 to move the plunger 65 downwardly so as to engage the contact 72 with contact terminal 76, and contacts 73 and 74 respectively with contact terminals 77 and 78, thus closing the circuit through the engineman's signal device 10 and also through the signal indicating device 13, so that both devices will operate to sound the signal initiated by the trainman.

In case the plug 87 is not inserted between the tines 84 and 85, as is the case on vehicle A, and the trainman desires to receive a signal from the engineman, the trainman operates the switch device 12 so that the plunger 65 is moved to its lowermost or second position. In this position, contact 72 engages contact terminal 76, and contact 74 engages contact terminal 78, contact 73 being disengaged from contact terminal 77, as shown in Fig. 4. When the engineman operates the switch device 9 to connect the two train wires 17 and 18, the circuit through the signal indicating device 13 will be completed as will the circuit through the signal indicating device 10 and both signals will operate to sound the signal from the engineman.

It will be noted that in signalling on the train, the rectifiers 46 and 90 prevent the flow of current from one source of current to the other, so that if one source of current is of greater voltage than the other, no damage can be done to the source of current having the lowest voltage.

When the brake valve device 6 is operated to emergency position, as shown in Fig. 3, fluid under pressure from the main reservoir 7 is supplied to the piston chamber 29 of the emergency switch device 8, through pipe and passage 21, chamber 20 in the brake valve device, port 119 in the rotary valve 22 and passage and pipe 30.

With the brake valve device in emergency position, the brake pipe 19 is vented to the atmosphere in the usual manner through pipe and passage 118, cavity 120 in the rotary valve 22, and passage 121.

Fluid under pressure supplied to the chamber 29 causes the piston 27 to move toward the right against the pressure of the spring 28. This action operates the arm 32 so that the switch drum is rotated in a counter clockwise direction, to the position shown in Fig. 3. In this position terminal contacts 34 and 36 will engage the contact 34, and terminal contacts 35, 37 and 60 will engage the contact 25.

Current supplied by the generator 11 will now flow through wire 64 to the train wire 18, and from thence through wire 113 to the magnet 102 of the magnet valve device 16. From the magnet 102, the current will flow back to the negative terminal of the generator 11, through wire 114, past the rectifier 115, to train wire 17, and from thence through wire 61, terminal contact 60, contact 24, terminal contact 37, and wire 63. In this way the magnet 102 will be energized by current, supplied from the generator 11, which flows through the train wires 17 and 18 in the reverse direction to the direction in which it flows when the apparatus is used for signalling purposes.

The magnet 102 being energized, valve 103 is seated and valve 104 is unseated against the pressure of spring 112, thus establishing communication through which fluid under pressure in chamber 106 supplied through pipe 107 from the brake pipe 19, flows to chamber 110 and from thence to piston chamber 93 in the vent valve device 15.

The pressure of fluid thus supplied to the chamber 93 causes the vent valve piston 94 to move toward the right against the pressure of spring 99, unseating the valve 95 from the seat ring 97.

With the valve 95 unseated, fluid under pressure from the brake pipe 19 is released to the atmosphere by way of valve chamber 96, past unseated valve 95, and through opening 101.

When each car of a train is provided with a magnet valve device 16 and a vent valve device 15, these devices throughout the length of the train, will operate simultaneously and thus cause all of the usual triple valve devices (not shown) to operate to emergency positions to effect an emergency application of the brakes substantially simultaneously on each car.

When the rear car only, of a train is provided with the magnet valve device 16 and vent valve device 15, fluid under pressure will be vented from the brake pipe 19 at the rear of the train at the same time as the brake pipe is vented at the front end of the train through the brake valve device 6, thus causing all of the triple valve devices (not shown) on the train to operate promptly to effect an emergency application of the brakes.

In the present embodiment of the invention there are no means provided in the brake valve device 6 for venting the piston chamber 29 in the emergency switch device 8 when the brake valve device is in release or running position, but this chamber is vented to the atmosphere through a port 122 through the piston 29, and a passage 123 through the end wall of the cylinder 26.

When the brake valve device 6 is operated to release position to release the brakes after an emergency application, and the piston chamber 29 in the emergency switch device 8 is vented to the atmosphere as just described, the pressure of the spring 28 moves the piston 27 to the left, causing the switch drum to rotate in a clockwise direction to the position shown in Fig. 1. In this position the circuit from the wire 62, through the switch device 8, to the wire 64, will be opened, thereby opening the electric circuit through the magnet 102 of the magnet valve device 16, thus deenergizing said magnet.

With the magnet 102 thus deenergized, the pressure of spring 112 causes the valve 104 to seat and cut off the further supply of fluid under pressure from the brake pipe to the chamber 93 in the vent valve device 15 when said brake pipe is being recharged.

When the pressure in the brake pipe 19 has been reduced to a predetermined low degree, the pressure of the spring 99 of the vent valve device 15, forces the piston 94 to the left, thereby seating the valve 95 against the seat ring 98, so as to cut off communication from the brake pipe 19 to the atmosphere through the vent valve device, the fluid in the piston chamber 93 being exhausted to the atmosphere through a port 124 leading from the valve chamber 105 of the magnet valve device 16.

It will be noted that the rectifier 115 serves to prevent the flow of current from the train wire 17 through the magnet 102 to the train wire 18 and consequently cause the energization of said magnet when the apparatus is used for signalling.

However, when the direction in which the current from the generator 11 flows through the train wires is reversed when the brake valve device 6 is actuated to emergency position, as explained above, the magnet 102 will be energized while the signal indicating devices will remain inactive. In this way a single source of current can be used for the purpose of supplying current for operating the engine signalling device, as well as for the purpose of supplying current in a reverse direction for operating the emergency valve devices on the cars of a train.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a combined brake and signal system for a train, a train line circuit comprising a train wire and a return, a source of direct current connected to said train line circuit, electrically controlled signal devices responsive only to direct current flowing in one direction, electrically controlled brake devices responsive only to direct current flowing in the direction opposite to which the signal devices are responsive, a brake valve, a source of fluid under pressure, a switch device, and fluid pressure actuated means controlled by said brake valve for operating said switch device to control the direction in which the current flows through the circuit.

2. In a combined brake and signal system, a train line circuit comprising a train wire and a return, a source of current for supplying direct current to the train line circuit, an electrically controlled signal device adapted to be operated by direct current flowing only in one direction through the train line circuit, a brake pipe, a brake valve device for venting fluid under pressure from said brake pipe to effect an application of the brakes, means controlled electrically for locally venting fluid from said brake pipe when said brake valve device is operated to effect an emergency application of the brakes, said brake pipe venting means being responsive only to direct current flowing through the train line circuit in the direction opposite to that by which said signal indicating device is responsive, and a fluid pressure operated switch device controlled by said brake valve device for reversing the direction in which the current flows through the circuit.

3. In a combined brake and signal system for a train, a train line circuit comprising a train wire and a return, a source of direct current connected to said train line circuit, electrically controlled signal devices responsive only to direct current flowing in one direction, electrically controlled brake devices responsive only to direct current flowing in the direction opposite to which the signal devices are responsive, a brake valve, a source of fluid under pressure, a fluid motor controlled by said brake valve, a switch device, and means operatively connecting said motor with said switch device, said switch device being actuated by said motor to reverse the direction of current flow in said train line circuit.

In testimony whereof I have hereunto set my hand.

MABLE M. THOMAS,
*Executive of the Last Will and Testament of Thomas H. Thomas, Deceased.*